(12) United States Patent
Clarkin et al.

(10) Patent No.: US 11,812,218 B1
(45) Date of Patent: Nov. 7, 2023

(54) CONCURRENT AUDIO AND HAPTICS FROM A SINGLE MECHANICAL TRANSDUCER

(71) Applicant: Cirrus Logic International Semiconductor Ltd., Edinburgh (GB)

(72) Inventors: Philip Clarkin, Austin, TX (US); Itisha Tyagi, Austin, TX (US); Kaichow Lau, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 179 days.

(21) Appl. No.: 16/592,164

(22) Filed: Oct. 3, 2019

Related U.S. Application Data

(60) Provisional application No. 62/744,749, filed on Oct. 12, 2018.

(51) Int. Cl.
*H04R 1/28* (2006.01)
*H04R 9/06* (2006.01)
(Continued)

(52) U.S. Cl.
CPC ........... *H04R 1/2803* (2013.01); *G06F 3/016* (2013.01); *G06F 3/167* (2013.01); *H04R 9/06* (2013.01);
(Continued)

(58) Field of Classification Search
CPC ...... H04R 1/1083; H04R 1/1091; H04R 1/24; H04R 1/26; H04R 1/2811; H04R 1/403; H04R 2201/107; H04R 2400/03; H04R 2420/07; H04R 2430/01; H04R 2460/01; H04R 2460/13; H04R 2499/15; H04R 29/00; H04R 29/002; H04R 3/12; H04R 3/14; H04R 5/02; H04R 5/04; H04R 9/043; H04R 9/06; H04B 5/0025; H04B 5/0043; H04B 5/02; H04B 7/02; H04B 7/022; H04B 7/028; H04B 7/04; H04B 7/0404; H04B 7/0413; H04B 7/0619; H04B 7/0628; H04B 7/10; H04B 7/12; H04B 7/22; H04B 1/16; H04B 1/401; H04S 2400/01; H04S 3/008; H04S 7/304; H04S 2400/03; H04S 2400/07; H04S 2400/11; H04S 2400/13;
(Continued)

(56) References Cited

U.S. PATENT DOCUMENTS 4,583,245 A * 4/1986 Gelow ..................... H04R 3/14
 381/100
7,969,287 B2 * 6/2011 Tschirhart ............. B60W 50/16
 340/384.7

(Continued)

*Primary Examiner* — Lun-See Lao
(74) *Attorney, Agent, or Firm* — Jackson Walker L.L.P

(57) ABSTRACT

A system may include a vibrating surface, a single mechanical transducer mechanically coupled to the vibrating surface, a signal processing subsystem configured to receive an audio signal and a haptic signal, process the audio signal and the haptic signal to generate a combined audio-haptic signal, and drive the combined audio-haptic signal to the single mechanical transducer in order to generate concurrent audio playback and haptic effects on the vibrating surface; and a control subsystem configured to, responsive to a haptic stimulus, modify at least one parameter of at least one of the audio signal and the haptic signal to accommodate the concurrent audio playback and haptic effects on the vibrating surface within at least one operational limit of the system.

34 Claims, 7 Drawing Sheets

(51) Int. Cl.
*G06F 3/01* (2006.01)
*G06F 3/16* (2006.01)

(52) U.S. Cl.
CPC ...... *H04R 2400/03* (2013.01); *H04R 2499/11* (2013.01)

(58) Field of Classification Search
CPC .. H04S 2400/15; H04S 2420/01; H04S 7/306; H04W 16/24; H04W 16/26; H04W 16/28; H04W 16/32; H04W 4/023; H04W 4/027; H04W 4/21; H04W 4/38; H04W 4/46; H04W 4/80; H04W 76/14; H04W 12/003; H04W 12/00503; H04W 12/06; H04W 12/08; H04W 4/021; H04W 4/029; H04W 4/40; H04W 4/70; H04W 52/02; H04W 52/0229; H04W 52/0235; G10L 15/22; G10L 2021/02166; G10L 21/0202; H04N 13/332; H04N 13/344; H04N 19/23; H04N 1/32352; H04N 21/26258; H04N 21/44204; H04N 21/4668; H04N 5/58

USPC .......................... 381/394, 334, 388, 386, 96; 340/407.1–407.3
See application file for complete search history.

(56) References Cited

U.S. PATENT DOCUMENTS

| | | | |
|---|---|---|---|
| 7,979,146 B2* | 7/2011 | Ullrich | G10L 21/06 700/94 |
| 9,389,688 B2* | 7/2016 | Tossavainen | H04R 7/04 |
| 9,992,571 B2 | 6/2018 | Hu et al. | |
| 10,009,685 B2 | 6/2018 | Hu et al. | |
| 2004/0227721 A1* | 11/2004 | Moilanen | G06F 1/1626 345/107 |
| 2005/0047621 A1* | 3/2005 | Cranfill | H04M 1/03 381/334 |
| 2016/0004311 A1* | 1/2016 | Yliaho | H04R 3/14 381/99 |
| 2018/0324524 A1* | 11/2018 | Hezar | H03F 3/187 |
| 2019/0069088 A1* | 2/2019 | Seiler | H04R 1/1016 |

* cited by examiner

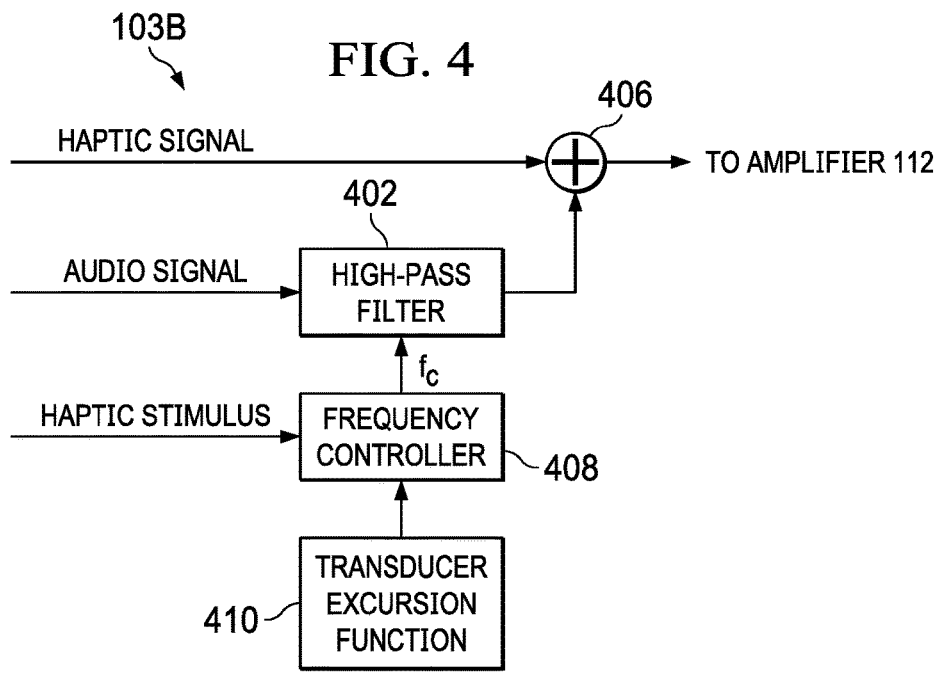
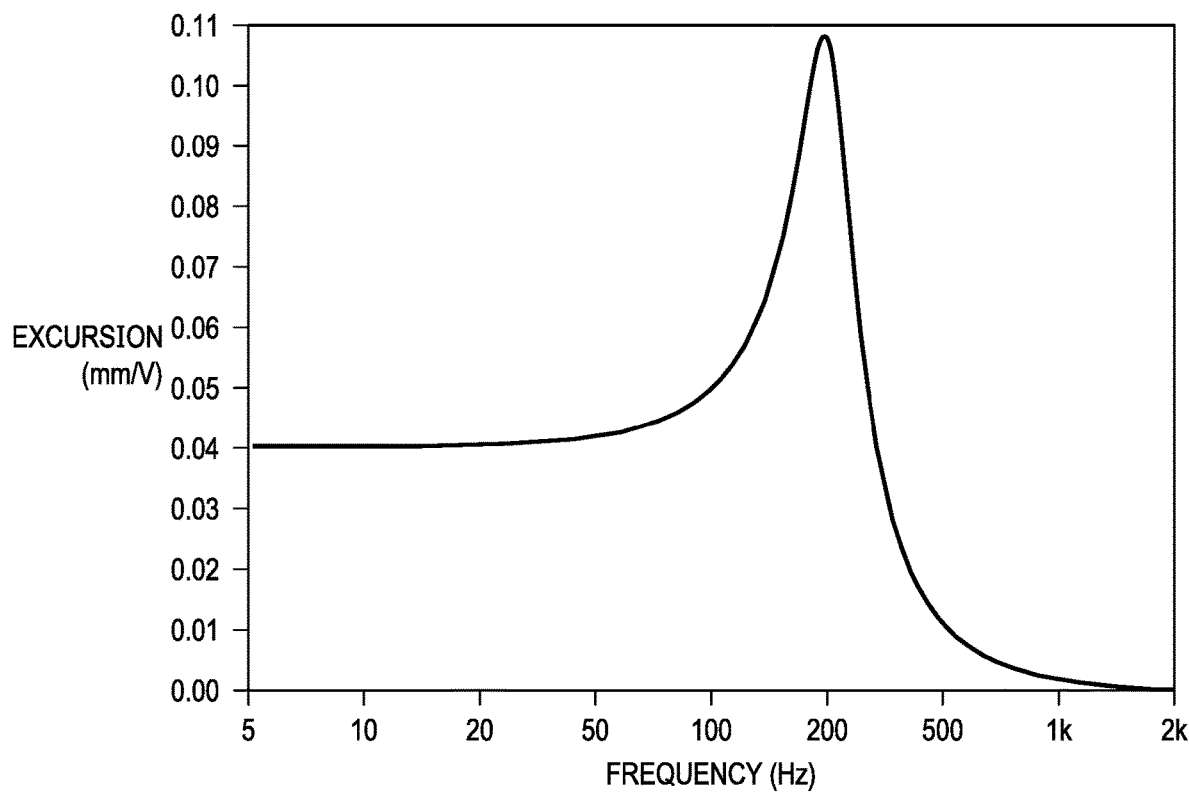

CONCURRENT AUDIO AND HAPTICS FROM A SINGLE MECHANICAL TRANSDUCER

RELATED APPLICATION

The present disclosure claims priority to U.S. Provisional Patent Application Ser. No. 62/744,749, filed Oct. 12, 2018, which is incorporated by reference herein in its entirety.

FIELD OF DISCLOSURE

The present disclosure relates in general to a mobile device, and more particularly, to using a controller and an amplifier system to drive a hybrid audio and haptic transducer with concurrent haptic and audio stimulus.

BACKGROUND

Existing consumer electronic devices (e.g., smartphones, tablets, personal computers, and televisions) may include a plurality of transducers for performing different functions. For example, consumer electronic devices have long included audio transducers (e.g., loudspeakers or other voice coil-based speakers) for generating sound for listening by users of such consumer electronic devices. As another example, more recently consumer electronic devices have begun including haptic transducers, for providing tactile feedback to a user of a consumer electronic device and/or for functioning as a virtual button to replace what would otherwise comprise a mechanical button on the consumer electronic device.

In order to reduce size, complexity, and/or cost of consumer electronic devices, it may be desirable to minimize the number of transducers present in a consumer electronic device, while maintaining the functionality that multiple transducers provide.

SUMMARY

In accordance with the teachings of the present disclosure, the disadvantages and problems associated with integrating multiple functions into a single transducer may be reduced or eliminated.

In accordance with embodiments of the present disclosure, a system may include a vibrating surface, a single mechanical transducer mechanically coupled to the vibrating surface, a signal processing subsystem configured to receive an audio signal and a haptic signal, process the audio signal and the haptic signal to generate a combined audio-haptic signal, and drive the combined audio-haptic signal to the single mechanical transducer in order to generate concurrent audio playback and haptic effects on the vibrating surface; and a control subsystem configured to, responsive to a haptic stimulus, modify at least one parameter of at least one of the audio signal and the haptic signal to accommodate the concurrent audio playback and haptic effects on the vibrating surface within at least one operational limit of the system.

In accordance with these and other embodiments of the present disclosure, a method may include receiving an audio signal and a haptic signal, processing the audio signal and the haptic signal to generate a combined audio-haptic signal, driving the combined audio-haptic signal to a single mechanical transducer in order to generate concurrent audio playback and haptic effects on a vibrating surface mechanically coupled to the single mechanical transducer, and responsive to a haptic stimulus, modifying at least one parameter of at least one of the audio signal and the haptic signal to accommodate the concurrent audio playback and haptic effects on the vibrating surface within at least one operational limit of the system.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates a functional block diagram of selected portions of another example controller of a mobile device, in accordance with embodiments of the present disclosure;

FIG. 5 illustrates an example excursion transfer function of a mechanical transducer, in accordance with embodiments of the present disclosure;

DETAILED DESCRIPTION

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively an electronic device may have a connector, e.g., a socket, for making a removable mating connection with a corresponding connector of an accessory apparatus and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal will generally be an analog time varying voltage signal, for example, a time varying waveform.

Figure 1A:
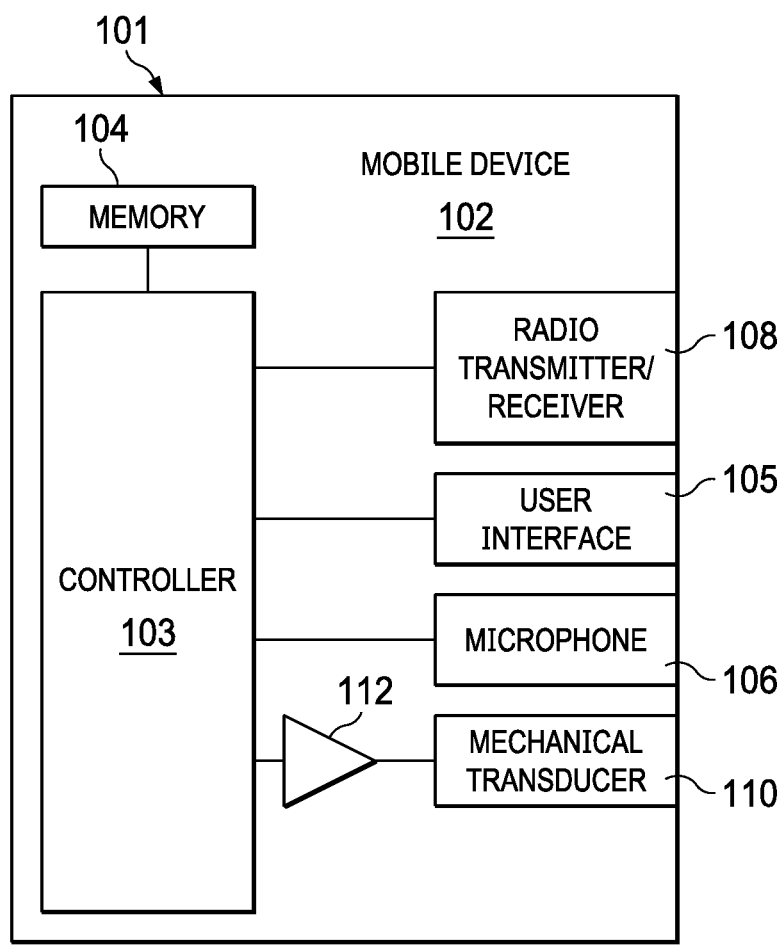
FIG. 1A illustrates a block diagram of selected components of an example mobile device, in accordance with embodiments of the present disclosure.

FIG. 1A illustrates a block diagram of selected components of an example mobile device 102, in accordance with embodiments of the present disclosure. As shown in FIG. 1A, mobile device 102 may comprise an enclosure 101, a controller 103, a memory 104, a user interface 105, a microphone 106, a radio transmitter/receiver 108, a mechanical transducer 110, and an amplifier 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, or any other device that may be readily transported on a person of a user of mobile device 102.

Controller 103 may be housed within enclosure 101 and may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, controller 103 may interpret and/or execute program instructions and/or process data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

User interface 105 may be housed at least partially within enclosure 101, may be communicatively coupled to controller 103, and may comprise any instrumentality or aggregation of instrumentalities by which a user may interact with mobile device 102. For example, user interface 105 may permit a user to input data and/or instructions into mobile device 102 (e.g., via a keypad and/or touch screen), and/or otherwise manipulate mobile device 102 and its associated components. User interface 105 may also permit mobile device 102 to communicate data to a user, e.g., by way of a display device.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

Mechanical transducer 110 may be housed at least partially within enclosure 101 or may be external to enclosure 101, may be communicatively coupled to controller 103 (e.g., via amplifier 112), and may comprise any system, device, or apparatus configured to undergo mechanical displacement or change in size or shape (e.g., change dimensions along a particular plane) when a voltage is applied to mechanical transducer 110. In some embodiments, mechanical transducer 110 may comprise a piezoelectric transducer made with one or more materials configured to, in accordance with the piezoelectric effect, undergo mechanical displacement or change in size or shape (e.g., change dimensions along a particular plane) when a voltage is applied to mechanical transducer 110. In other embodiments, mechanical transducer 110 may comprise a linear resonant actuator or other coil-based dynamic transducer for producing an oscillating mechanical force across a single axis, wherein an alternating current or voltage drives a coil pressed against a moving mass connected to a spring, such that when the coil is driven at the resonant frequency of the spring, such linear resonant actuator or other vibrational actuator may vibrate with a perceptible force.

Amplifier 112 may comprise any suitable system, device, or apparatus configured to receive a voltage or current waveform from controller 103 and amplify and/or otherwise condition such voltage or current waveform to drive a driving signal which is a function of such voltage or current waveform to mechanical transducer 110.

Although specific example components are depicted above in FIG. 1A as being integral to mobile device 102 (e.g., controller 103, memory 104, user interface 105, microphone 106, radio transmitter/receiver 108, mechanical transducer 110, and amplifier 112), a mobile device 102 in accordance with this disclosure may comprise one or more components not specifically enumerated above. In addition, although controller 103 and amplifier 112 are shown as separate components in FIG. 1A, in some embodiments, controller 103 and amplifier 112 may be formed on the same integrated circuit or module.

Figure 1B:
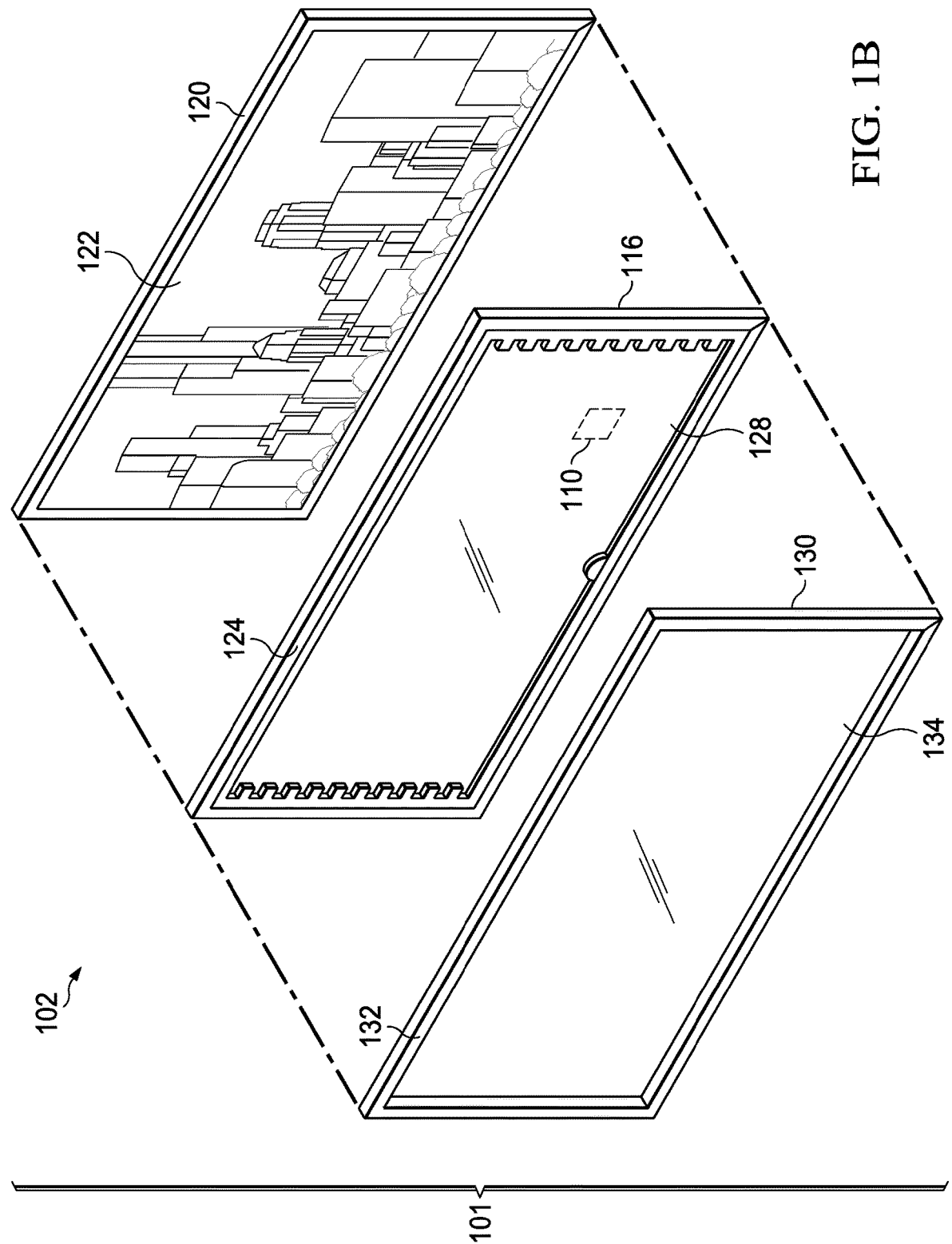
FIG. 1B illustrates an exploded perspective view of selected components of an example mobile device, in accordance with embodiments of the present disclosure.

FIG. 1B illustrates an exploded perspective view of selected components of example mobile device 102, in accordance with embodiments of the present disclosure.

As shown in FIG. 1B, enclosure 101 may include a main body 120, a mechanical transducer assembly 116, and a cover assembly 130, such that when constructed, mechanical transducer assembly 116 is interfaced between main body 120 and cover assembly 130. Main body 120 may house a number of electronics, including controller 103, memory 104, radio transmitter/receiver 108, and/or microphone 106, as well as a display (e.g., a liquid crystal display) of user interface 105.

Mechanical transducer assembly 116 may comprise a frame 124 configured to hold and provide mechanical structure for one or more mechanical transducers 110 (which may be coupled to controller 103) and transparent film 128.

Cover assembly 130 may comprise a frame 132 configured to hold and provide mechanical structure for cover 134. Cover 134 may be made from any suitable material (e.g., ceramic) that allows visibility through cover 134 (e.g., which may be transparent), protection of mechanical transducer 110 and display 122, and/or user interaction with display 122.

Although FIG. 1B illustrates mechanical transducer assembly 116 being situated between cover assembly 130 and display 122, in some embodiments, mechanical transducer assembly 116 may reside "behind" display 122, such that display 122 is situated between cover 130 and mechanical transducer assembly 116. In addition, although FIG. 1B illustrates mechanical transducer 110 located at a particular location within mechanical transducer assembly 116, mechanical transducer 110 may be located at any suitable location below cover 134 and/or display 122 (e.g., underneath cover 134 and/or display 122 from a perspective of a user viewing display 122).

In addition, although FIG. 1B depicts mechanical transducer 110 present within mechanical transducer assembly 116 and capable of inducing vibration on cover 130 or display 122, in some embodiments, mechanical transducer 110 may be placed proximate to main body 120 and may be capable of causing a suitable surface of main body 120 to vibrate in order to generate sound.

Although FIGS. 1A and 1B depict only a single mechanical transducer 110, mobile device 102 may include any suitable number of mechanical transducers 110.

Mechanical transducers, including piezoelectric transducers, linear resonant actuators, and coil-based dynamic transducers, are typically used to convert electric signals into mechanical force. Thus, when used in connection with display 122, cover 134, and/or main body 120, a mechanical transducer 110 may cause vibration on a surface, which in turn may produce pressure waves in air, generating human-audible sound. Accordingly, in operation of mobile device 102, a mechanical transducer 110 may be driven by amplifier 112 under the control of controller 103 in order to generate acoustical sound by vibrating the surface of display 122, cover 134, and/or main body 120. Further, such vibration on a surface may also generate haptic effects which a user may perceive through tactile senses. Accordingly, in operation of mobile device 102, a mechanical transducer 110 may be driven by amplifier 112 under the control of controller 103 in order to generate haptic sensations vibrating the surface of display 122, cover 134, and/or main body 120.

Thus, a single mechanical transducer 110 may be capable of generating both haptic effects and audio playback. Such a mechanical transducer 110 may be advantageous for many reasons. For example, a mechanical transducer 110 for generating audio by vibrating a surface of mobile device 102 may be attractive, as it may replace a front-facing earpiece speaker receiver opening of the mobile device 102, freeing up space to extend a display screen of user interface 105 to the top edge of enclosure 101. Eliminating such front-facing earpiece speaker receiver may thus allow mobile device manufacturers to increase overall touchscreen display size while also simplifying construction of mobile devices, at least because a surface audio transducer does not require an acoustic back volume within a mobile device and does not require a direct acoustic path. Removal of the acoustic path may simplify enclosure design as it may reduce or eliminate the risk of intrusion by dust, water, and/or other foreign substances into the interior of the enclosure. As another example, if a surface audio transducer is also usable for haptic feedback, it may eliminate the need for a separate haptic transducer.

When such a single mechanical transducer 110 is used for generating audio playback and haptic effects, it may be desirable for mechanical transducer 110 to be able to concurrently generate audio playback and haptic effects, instead of generating audio playback and haptic effects one at a time. For example, when a user applies force to a virtual button of mobile device 102, it may be desirable to provide simultaneous haptic effects (e.g., vibration emulating the press of a mechanical button), and audio playback (e.g., a sound emulating the sound of a mechanical button being pressed). As another example, it may be desirable to provide alerts to a user using haptic effects while the user is conducting a voice call or listening to audio playback on mobile device 102.

Figure 2:
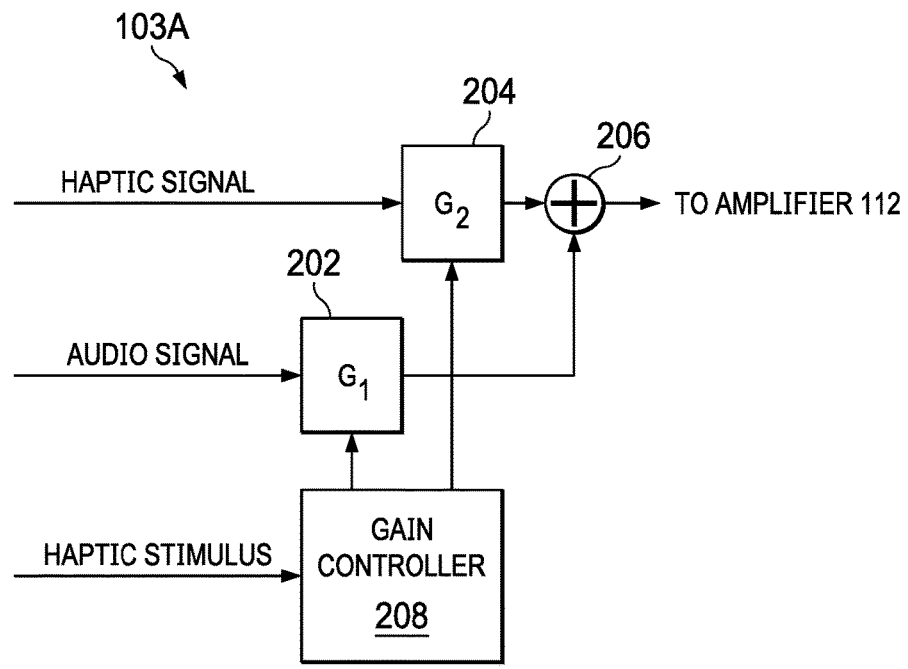
FIG. 2 illustrates a functional block diagram of selected portions of an example controller of a mobile device, in accordance with embodiments of the present disclosure.

FIG. 2 illustrates a functional block diagram of selected portions of a controller 103A of a mobile device 102, in accordance with embodiments of the present disclosure. In some embodiments, controller 103A depicted in FIG. 2 may be used to implement controller 103 shown in FIG. 1A. As shown in FIG. 2, controller 103A may include an audio gain element 202 having a gain $G_1$, a haptic gain element 204 having a gain $G_2$, a combiner 206, and a gain controller 208.

Audio gain element 202 may include any suitable system, device, or apparatus configured to receive an audio signal (e.g., downlink speech from a voice call, internal playback audio, etc.) and apply gain $G_1$ to such audio signal. Likewise, haptic gain element 204 may include any suitable system, device, or apparatus configured to receive a haptic signal (e.g., a haptic waveform signal for generating a particular haptic effect) and apply gain $G_2$ to such haptic signal. Combiner 206 may include any suitable system, device, or apparatus configured to receive the gained audio signal from audio gain element 202 and the gained haptic signal from haptic gain element 204, combine such signals into a combined audio-haptic signal, and communicate such combined audio-haptic signal to amplifier 112, such that the combined audio-haptic signal is reproduced at mechanical transducer 110 to generate haptic effects and audio playback, including at times generating concurrent haptic effects and audio playback.

Gain controller 208 may include any suitable system, device, or apparatus configured to receive an indication of haptic stimulus (e.g., a user interaction with a virtual button of mobile device 102, an alert, etc.) and in response to such haptic stimulus, control gains $G_1$ and $G_2$ in order to control the relative haptic content and audio content present in the combined audio-haptic signal communicated to amplifier 112 in order to accommodate audio playback and haptic feedback within a full-scale level of the signal path of mechanical transducer 110 (e.g., to prevent signal distortion caused by signal clipping in the signal path of mechanical transducer 110 and/or to prevent damage to mechanical transducer 110). To further illustrate example functionality of gain controller 208, reference is made to FIG. 3.

Figure 3:
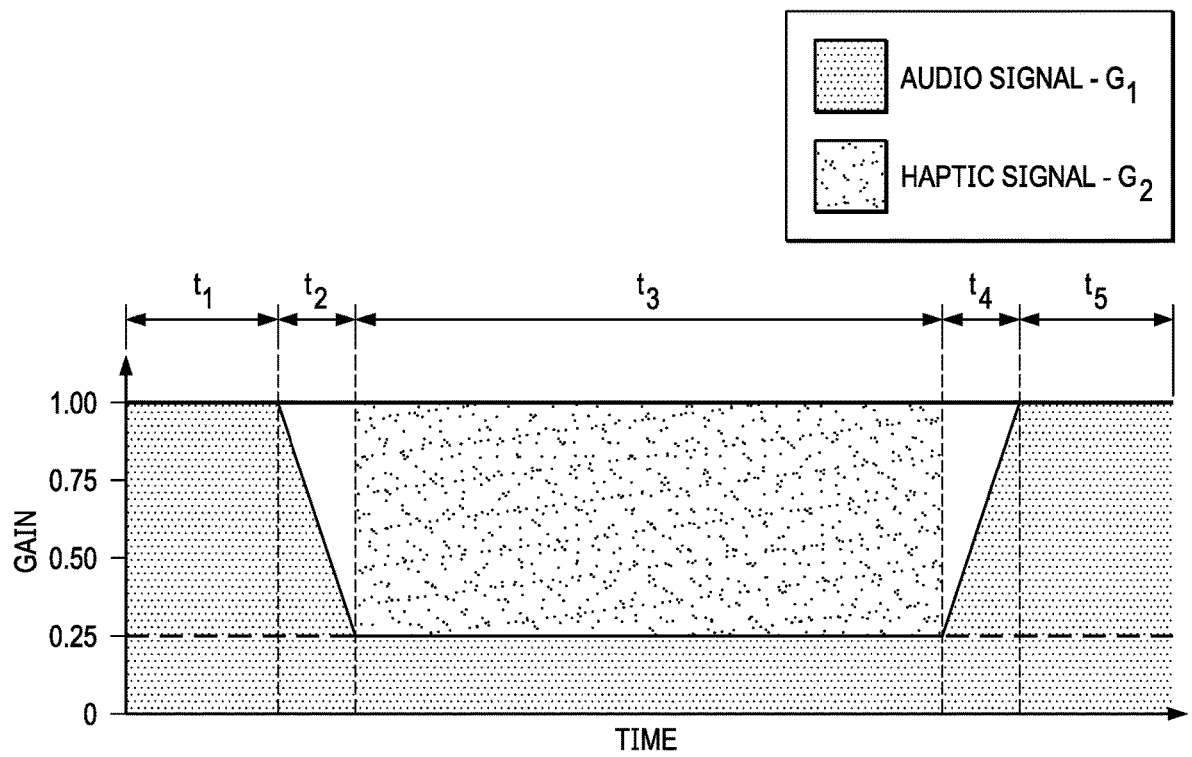
FIG. 3 illustrates a graph of signal gain versus time for a generation of concurrent audio playback and haptic effects at a single mechanical transducer, in accordance with embodiments of the present disclosure.

FIG. 3 illustrates a graph of signal gain versus time for a generation of concurrent audio playback and haptic effects at a single mechanical transducer 110, in accordance with embodiments of the present disclosure. As shown in FIG. 3, in the absence of haptic events during a time period $t_1$, audio gain $G_1$ may be set at its maximum value (e.g., 1.00) so that audio playback may be driven to mechanical transducer 110 at or near the full-scale magnitude of the signal path of mechanical transducer 110. However, at or near the beginning of a time period $t_2$, a haptic stimulus (e.g., a user interaction with a virtual button of mobile device 102, an alert, etc.) may occur and during time period $t_2$, gain controller 208 may enable gain element 204 and ramp audio gain $G_1$ from its maximum value to a value sufficiently small enough to allow the combined audio-haptic signal communicated to amplifier 112 to be played without exceeding the full-scale magnitude of the signal path of mechanical transducer 110 (or without damaging mechanical transducer 110). In some embodiments, gain controller 208 may tune haptic gain $G_2$ such that the haptic perception of the haptic effect by a user is acceptable (e.g., subjective tuning), and then fixed once tuned. In addition, the values of audio gain $G_1$ and haptic gain $G_2$ during concurrent playback may be equal in unity, in order to reduce or eliminate signal clipping in the signal path of mechanical transducer 110. For instance, in the specific example shown in FIG. 3, haptic gain $G_2$ may be set to 0.75 when haptic effects are being generated at mechanical transducer 110, and thus, audio gain $G_1$ may be ramped in this specific example from 1.00 to 0.25. Such ramping may reduce or eliminate perceptible audio artifacts (e.g., "clicks" and "pops") associated with the reduction in audio gain $G_1$.

As a result, during a time period $t_3$, audio playback and haptic effects may concurrently be generated by controller 103A, albeit with attenuated audio playback. Once the haptic event has concluded, during a time period $t_4$ gain controller 208 may disable gain element 204 and ramp audio gain $G_1$ back to its maximum value (e.g., 1.00). Again, such ramping may reduce or eliminate perceptible audio artifacts (e.g., "clicks" and "pops") associated with the increase in audio gain $G_1$.

After gain controller 208 ramps audio gain $G_1$ back to its maximum value during time period $t_5$, audio playback may be driven to mechanical transducer 110 at or near the full-scale magnitude of the signal path of mechanical transducer 110.

FIG. 4 illustrates a functional block diagram of selected portions of a controller 103B of a mobile device 102, in accordance with embodiments of the present disclosure. In some embodiments, controller 103B depicted in FIG. 4 may be used to implement controller 103 shown in FIG. 1A. As shown in FIG. 4, controller 103B may include a high-pass filter 402 having a variable corner frequency $f_c$, a combiner 406, a frequency controller 408, and a memory storing information indicative of a transducer excursion function 410.

High-pass filter 402 may include any suitable system, device, or apparatus configured to receive an audio signal (e.g., downlink speech from a voice call, internal playback audio, etc.) and high-pass filter such audio signal in order to generate a filtered audio signal in which content of the audio signal below the variable corner frequency $f_c$ of high-pass filter 402 is attenuated or eliminated. Combiner 406 may include any suitable system, device, or apparatus configured to receive the filtered audio signal from high-pass filter 402 and a haptic signal, combine such signals into a combined audio-haptic signal, and communicate such combined audio-haptic signal to amplifier 112, such that the combined audio-haptic signal is reproduced at mechanical transducer 110 to generate haptic effects and audio playback, including at times generating concurrent haptic effects and audio playback.

Frequency controller 408 may include any suitable system, device, or apparatus configured to receive an indication of haptic stimulus (e.g., a user interaction with a virtual button of mobile device 102, an alert, etc.) and in response to such haptic stimulus, control a corner frequency $f_c$ of high-pass filter 402 in order to control the relative haptic content and audio content present in the combined audio-haptic signal communicated to amplifier 112 in order to accommodate audio playback and haptic feedback within a full-scale level of the signal path of mechanical transducer 110 (e.g., to prevent signal distortion caused by signal clipping in the signal path of mechanical transducer 110 and/or to prevent damage to mechanical transducer 110).

In addition, control of corner frequency $f_c$ by frequency controller 408 may be based on transducer excursion function 410. In such embodiments, frequency controller 408 may exploit transducer excursion function 410 in order to filter out, using high-pass filter 402, frequencies of the audio signal that may represent an excursion risk. Thus, high-pass filter 402 may, in the presence of haptic events, remove frequency content of the audio signal in a high-excursion band of the frequency spectrum of mechanical transducer 410, and such high-excursion band may instead be used for generation of haptic effects. To further demonstrate, FIG. 5 illustrates an example excursion transfer function 410 of mechanical transducer 110 as a function of excursion (e.g., in terms of millimeters per volt) versus frequency, in accordance with embodiments of the present disclosure. In the example excursion transfer function 410 represented by FIG. 5, mechanical transducer 110 has fairly high excursion in frequencies below 400 hertz. Thus, in response to haptic stimulus, frequency controller 408 may increase corner frequency $f_c$ to such frequency, such that haptic effects can be generated at frequencies below corner frequency $f_c$ concurrently with audio playback without the risk that audio signal content at such lower frequencies would cause overexcursion of mechanical transducer 110.

Figure 6:
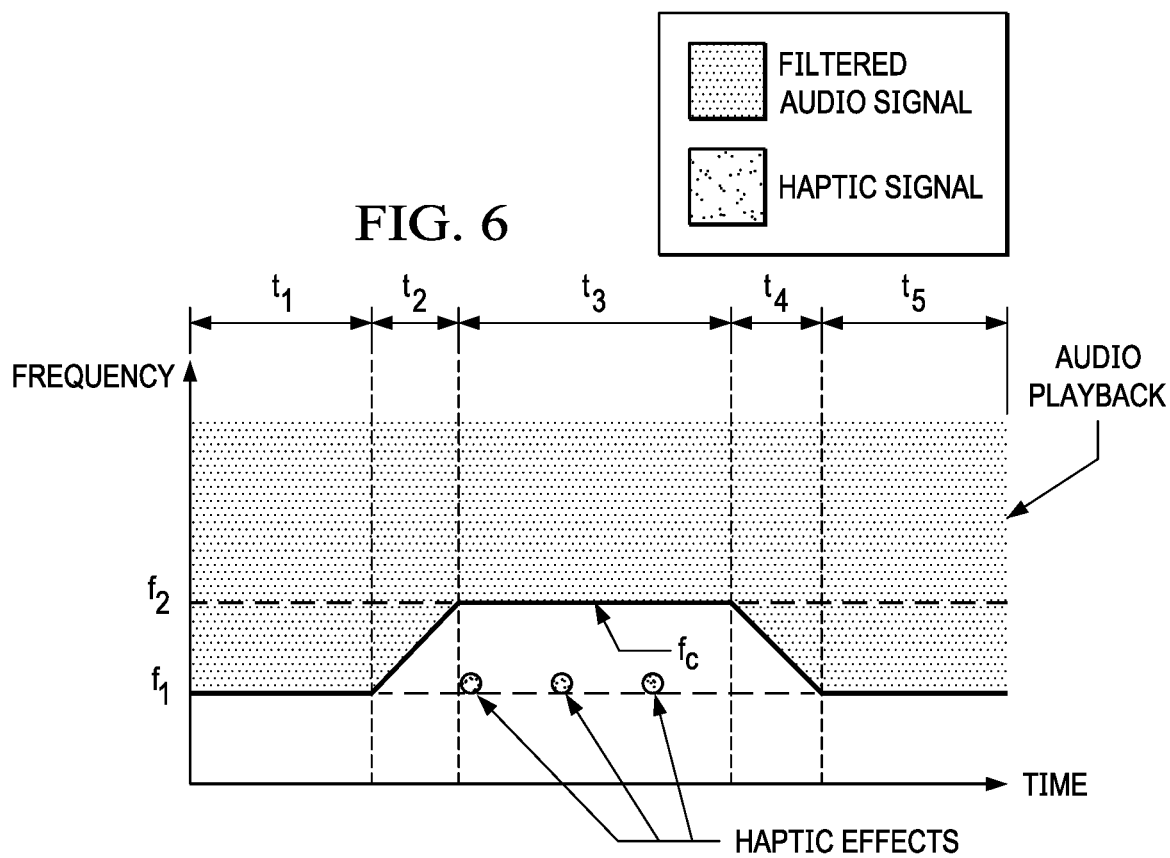
FIG. 6 illustrates a graph of corner frequency versus time for a generation of concurrent audio playback and haptic effects at a single mechanical transducer, in accordance with embodiments of the present disclosure.
Figure 7:
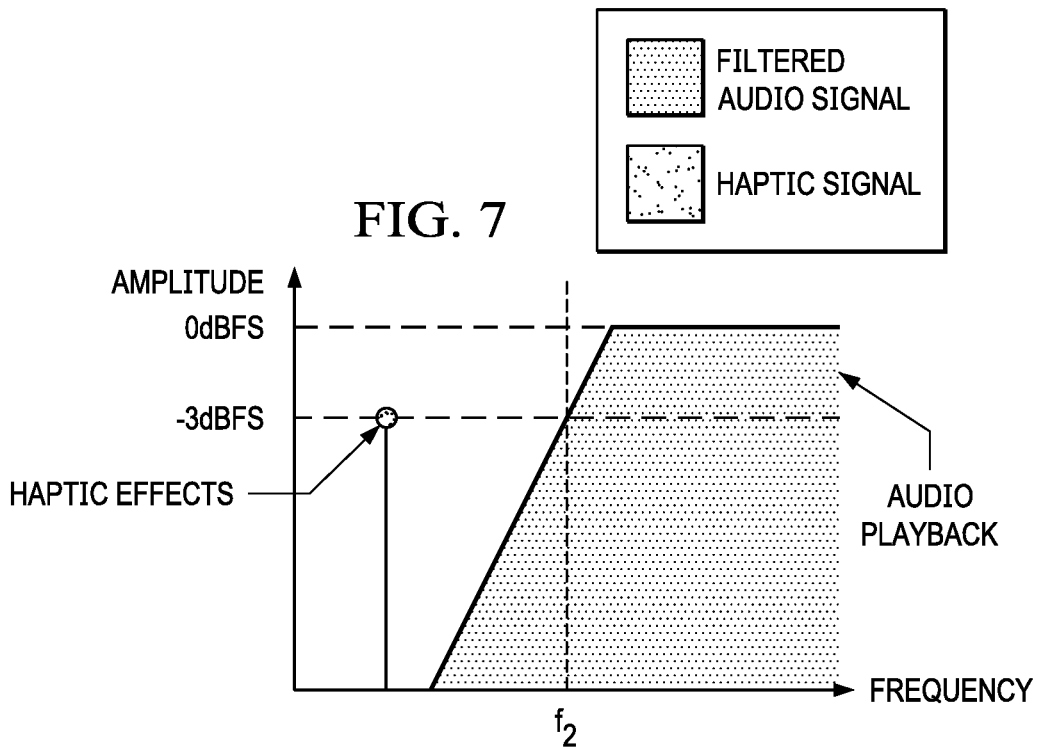
FIG. 7 illustrates a graph depicting haptic signal content and audio signal content versus frequency of a combined audio-haptic signal delivered to an amplifier during concurrent generation of playback audio and haptic effects to a single transducer, in accordance with embodiments of the present disclosure.

To further illustrate example functionality of frequency controller 408, reference is made to FIGS. 6 and 7. FIG. 6 illustrates a graph of corner frequency versus time for a generation of concurrent audio playback and haptic effects at a single mechanical transducer 110, in accordance with embodiments of the present disclosure. As shown in FIG. 6, in the absence of haptic events during a time period $t_1$, corner frequency $f_c$ may be set at a first frequency $f_1$ (e.g., 2 hertz) so that high-pass filter 402 filters out content of the audio signal below first frequency $f_1$ in order to generate the filtered audio signal. However, at or near the beginning of a time period $t_2$, a haptic stimulus (e.g., a user interaction with a virtual button of mobile device 102, an alert, etc.) may occur and during time period $t_2$, frequency controller 408 may ramp corner frequency $f_c$ from first frequency $f_1$ to a second frequency $f_2$ wherein second frequency $f_2$ is chosen such that frequencies above second frequency $f_2$ have a relatively low excursion compared to frequencies below second frequency $f_2$. Such ramping may reduce or eliminate perceptible audio artifacts (e.g., "clicks" and pops") associated with the increase in corner frequency $f_c$.

As a result, during a time period $t_3$, audio playback and haptic effects may concurrently be generated by controller 103B, albeit with attenuated audio playback at frequencies below second frequency $f_2$. However, such attenuation at these lower frequencies may be minimally perceivable to a listener, as most of the audio spectrum remains preserved, while reserving these lower frequencies for haptic events which may have maximized effects at such frequencies. FIG. 7 illustrates a graph depicting haptic signal content and audio signal content versus frequency of a combined audio-haptic signal delivered to amplifier 112 during time period $t_3$, in accordance with embodiments of the present disclosure.

Turning again to FIG. 6, once the haptic event has concluded, during a time period $t_4$, frequency controller 408 may ramp corner frequency $f_c$ back to first frequency Again, such ramping may reduce or eliminate perceptible audio artifacts (e.g., "clicks" and pops") associated with the decrease in corner frequency $f_c$. After gain controller 408 ramps corner frequency $f_c$ back to first frequency $f_1$, during time period $t_5$, controller 103B may return to operating as it did during time period $t_1$.

Although the foregoing contemplates that frequency controller 408 is configured to dynamically vary corner frequency $f_c$, in some embodiments frequency controller 408 may be configured to dynamically enable high-pass filter 402 in response to haptic stimulus and dynamically disable high-pass filter 402 in response to completion of a haptic event.

Figure 8A:
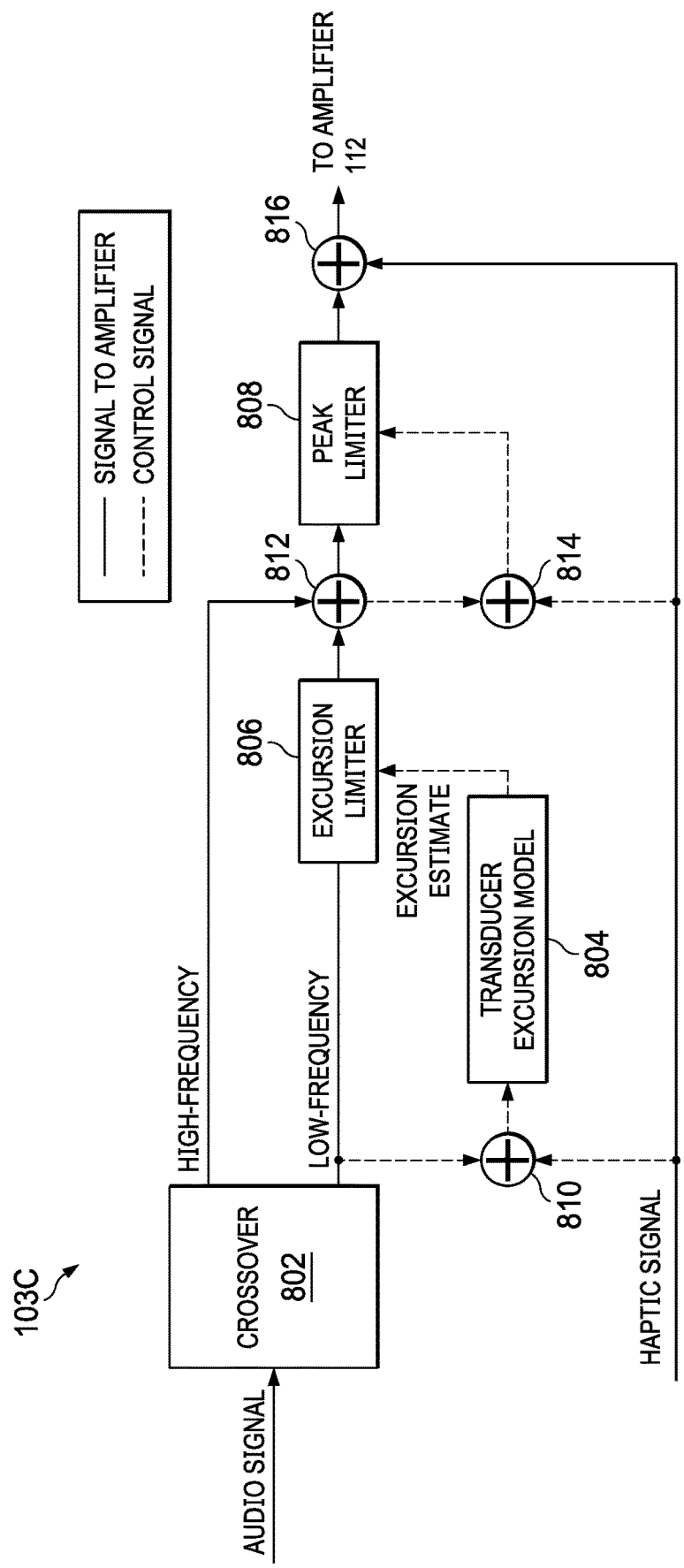
FIGS. 8A and 8B illustrate a functional block diagram of selected portions of another example controller of a mobile device, in accordance with embodiments of the present disclosure.

FIG. 8A illustrates a functional block diagram of selected portions of a controller 103C of a mobile device 102, in accordance with embodiments of the present disclosure. In some embodiments, controller 103C depicted in FIG. 8A may be used to implement controller 103 shown in FIG. 1A. As shown in FIG. 8A, controller 103C may include a crossover 802, a memory storing information indicative of a transducer excursion model 804, an excursion limiter 806, a peak limiter 808, and a plurality of combiners 810, 812, 814, and 816.

Crossover 802 may comprise any suitable system, device, or apparatus configured to receive an audio signal and split the audio signal into a high-frequency component and a low-frequency component, wherein a crossover frequency at which the signal is split into the high-frequency component and the low-frequency component may be chosen in any suitable manner. For example, in some embodiments, the crossover frequency may be chosen at a frequency for which the magnitude of excursion of mechanical transducer 110 is significantly lower above such crossover frequency than it is below such crossover frequency. Thus, a crossover frequency may be selected such that excursion is isolated to the low-frequency band. However, in some embodiments (not explicitly shown), excursion may be isolated to the high-frequency band.

Combiner 810 may combine the low-frequency component of the audio signal with a haptic signal and provide such combined signal to transducer excursion model 804. Transducer excursion model 804 may comprise any suitable representation of excursion as a function of a driving signal for driving mechanical transducer 110. Accordingly, transducer excursion model 804 may be applied to the combined signal generated by combiner 810 to generate an excursion estimate representative of a hypothetical excursion of mechanical transducer 110 if driven with the combined signal generated by combiner 810. Although not shown in FIG. 8A, in some embodiments, transducer excursion model 804 may be adaptively updated based on a monitored voltage and a monitored current associated with mechanical transducer 110 in order to compensate for variation in mechanical transducer 110, similar to that disclosed in one or more of U.S. Pat. Nos. 9,992,571, and 10,009,685, which are incorporated by reference herein in their entireties.

Excursion limiter 806 may comprise any suitable system, device, or apparatus configured to receive the low-frequency component of the audio signal and the excursion estimate, and based on the excursion estimate, apply limiting to the low-frequency component of the audio signal to generate an excursion-limited low-frequency component of the audio signal in order to ensure that the excursion-limited low-frequency component, when combined with the haptic signal and driven to mechanical transducer 110, does not cause overexcursion of mechanical transducer 110 that may damage mechanical transducer 110. Thus, because the haptic signal may use a portion of the excursion headroom of mechanical transducer 110, excursion limiter 806 may reduce the level of the audio signal, based on the excursion estimate, by an amount sufficient such that when the excursion-limited low-frequency component is summed with the haptic signal, the combined signal will not exceed an excursion limit of mechanical transducer 110.

Combiner 812 may combine the excursion-limited low-frequency component and the high-frequency component of the audio signal to generate an excursion-limited audio signal. Combiner 814 may combine the excursion-limited audio signal and the haptic signal to generate a control signal for peak limiter 808. Peak limiter 808 may comprise any suitable system, device, or apparatus configured to receive the excursion-limited audio signal and based on the control signal for peak limiter 808, generate a peak-limited audio signal in which the magnitude of the peak-limited audio signal is limited in order to minimize or eliminate signal clipping which may lead to signal distortion. Combiner 816 may combine the peak-limited audio signal with the haptic signal to generate a combined audio-haptic signal which may be communicated to amplifier 112.

In some embodiments of controller 103C, peak limiter 808 (as well as combiners 814 and 816) may not be present, in which case combiner 812 may combine the excursion-limited low-frequency component of the audio signal, the high-frequency component of the audio signal, and the haptic signal to generate the combined audio-haptic signal which may be communicated to amplifier 112.

Figure 8B:
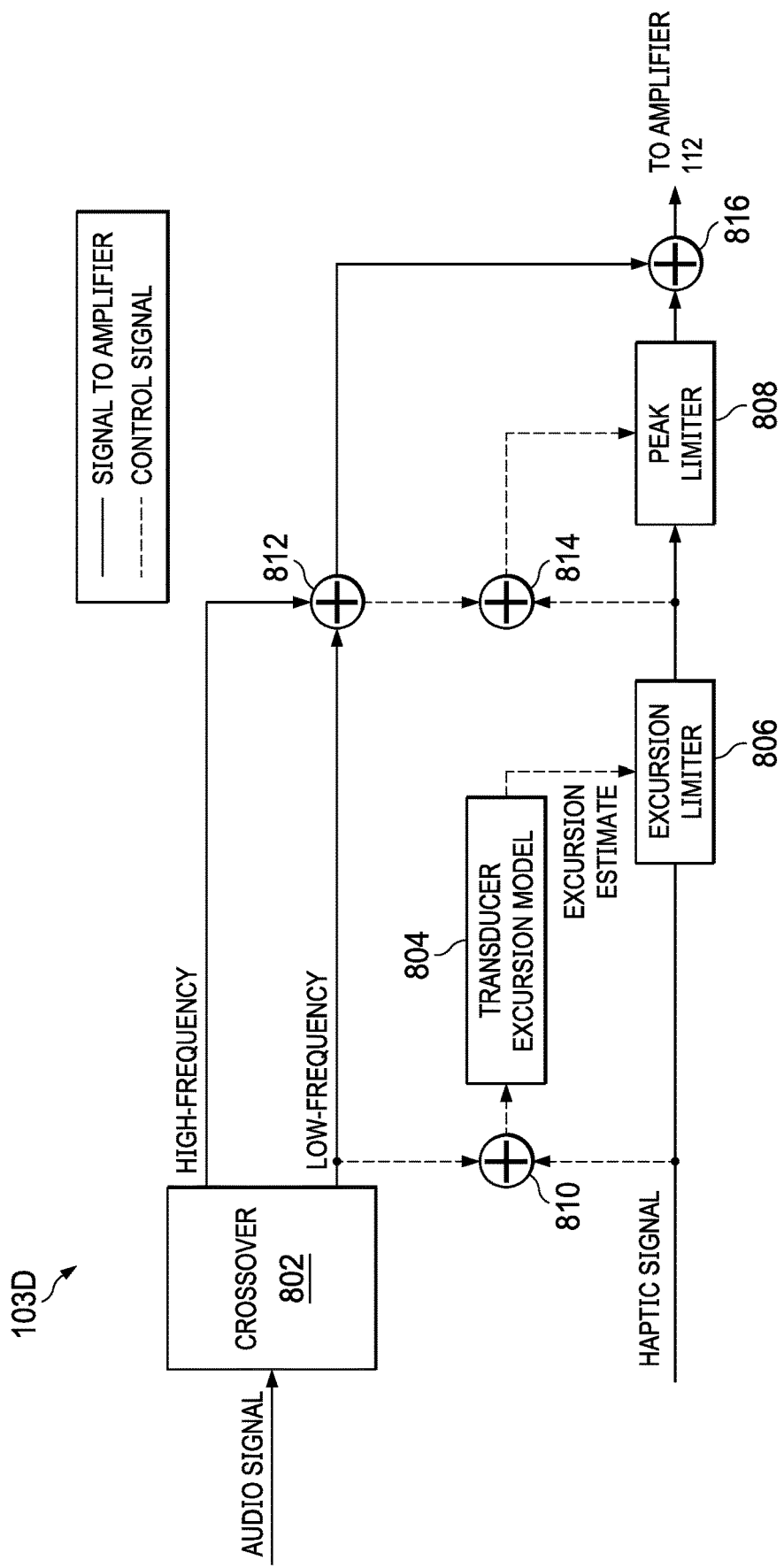

FIG. 8B illustrates a functional block diagram of selected portions of a controller 103D of a mobile device 102, in accordance with embodiments of the present disclosure. In some embodiments, controller 103D depicted in FIG. 8B may be used to implement controller 103 shown in FIG. 1A. As shown in FIG. 8B, controller 103D, similar to controller 103C of FIG. 8A, may include a crossover 802, a memory storing information indicative of a transducer excursion model 804, an excursion limiter 806, a peak limiter 808, and a plurality of combiners 810, 812, 814, and 816. However, such components may be arranged differently in controller 103D, as described in greater detail below.

In controller 103D, excursion limiter 806 may comprise any suitable system, device, or apparatus configured to receive the haptic signal and the excursion estimate, and based on the excursion estimate, apply limiting to the haptic signal to generate an excursion-limited haptic signal in order to ensure that the excursion-limited haptic signal, when combined with the low-frequency component of the audio signal and driven to mechanical transducer 110, does not cause overexcursion of mechanical transducer 110 that may damage mechanical transducer 110. Thus, because the low-frequency component of the audio signal may use a portion of the excursion headroom of mechanical transducer 110, excursion limiter 806 may reduce the level of the haptic signal, based on the excursion estimate, by an amount sufficient such that when the low-frequency component is summed with the excursion-limited haptic signal, the combined signal will not exceed an excursion limit of mechanical transducer 110.

Combiner 812 may combine the low-frequency component and the high-frequency component of the audio signal to generate a combined audio signal. Combiner 814 may combine the combined audio signal and the excursion-limited haptic signal to generate a control signal for peak limiter 808. Peak limiter 808 may comprise any suitable system, device, or apparatus configured to receive the excursion-limited haptic signal and based on the control signal for peak limiter 808, generate a peak-limited haptic signal in which the magnitude of the peak-limited haptic signal is limited in order to minimize or eliminate signal clipping which may lead to signal distortion. Combiner 816 may combine the combined audio signal with the peak-limited haptic signal to generate a combined audio-haptic signal which may be communicated to amplifier 112.

In some embodiments of controller 103D, peak limiter 808 (as well as combiners 814 and 816) may not be present, in which case combiner 812 may combine the low-frequency component of the audio signal, the high-frequency component of the audio signal, and the excursion-limited haptic signal to generate the combined audio-haptic signal which may be communicated to amplifier 112.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
    a vibrating surface;
    a single mechanical transducer mechanically coupled to the vibrating surface;
    a signal processing subsystem configured to receive an audio signal and a haptic signal, process the audio signal and the haptic signal to generate a combined audio-haptic signal, and drive the combined audio-haptic signal to the single mechanical transducer in order to generate concurrent audio playback and haptic effects on the vibrating surface; and
    a control subsystem configured to, responsive to a stimulus for generating haptic effects on the vibrating surface, other than haptic feedback from the vibrating surface, modify at least one parameter of at least one of the audio signal and the haptic signal to accommodate the concurrent audio playback and haptic effects on the vibrating surface within at least one operational limit of the system.

2. The system of claim 1, wherein:
    the at least one parameter comprises a gain applied to the audio signal in the signal processing subsystem prior to combination with the haptic signal; and the at least one operational limit of the system comprises a full-scale magnitude of the signal processing subsystem.

3. The system of claim 2, wherein the control subsystem is configured to modify the gain based on a magnitude of the haptic signal.

4. The system of claim 2, wherein the control subsystem is configured to ramp the gain from a first gain to a second gain lower than the first gain in response to the stimulus.

5. The system of claim 1, wherein:
the at least one parameter comprises filtering applied to the audio signal in the signal processing subsystem prior to combination with the haptic signal; and
the at least one operational limit of the system comprises an excursion limit of the single mechanical transducer.

6. The system of claim 5, wherein:
the signal processing subsystem comprises a filter configured to apply the filtering to the audio signal; and
the control subsystem is configured to control a frequency response of the filter based on an excursion of the single mechanical transducer as a function of frequency.

7. The system of claim 6, wherein:
the filter comprises a high-pass filter; and
the control subsystem is configured to control a corner frequency of the high-pass filter based on the excursion of the single mechanical transducer as the function of frequency.

8. The system of claim 1, wherein:
the at least one parameter comprises limiting applied to the audio signal in the signal processing subsystem prior to combination with the haptic signal; and
the at least one operational limit comprises an excursion limit of the single mechanical transducer.

9. The system of claim 8, wherein the signal processing subsystem comprises:
a crossover configured to split the audio signal into a high-frequency component and a low-frequency component; and
an excursion limiter configured to limit one of the high-frequency component and the low-frequency component so that when such one of the high-frequency component and the low-frequency component as limited is combined with the haptic signal, such combined signal remains within the excursion limit of the single mechanical transducer.

10. The system of claim 9, wherein:
the control subsystem is configured to determine an excursion estimate based on the haptic signal and such one of the high-frequency component and the low-frequency component; and
the excursion limiter is configured to limit such one of the high-frequency component and the low-frequency component based on the excursion estimate.

11. The system of claim 10, wherein:
the at least one operational limit further comprises a full-scale magnitude of the signal processing subsystem; and
the signal processing subsystem further comprises a peak limiter to limit the combined audio-haptic signal to the full-scale magnitude.

12. The system of claim 1, wherein the vibrating surface comprises a display screen of an electronic device.

13. The system of claim 1, wherein the single mechanical transducer comprises a piezoelectric transducer.

14. The system of claim 1, wherein the single mechanical transducer comprises a coil-based dynamic transducer.

15. The system of claim 1, wherein the single mechanical transducer comprises a speaker.

16. The system of claim 1, wherein:
the at least one parameter comprises a gain applied to the haptic signal in the signal processing subsystem prior to combination with the audio signal; and
the at least one operational limit of the system comprises a full-scale magnitude of the signal processing subsystem.

17. The system of claim 1, wherein:
the at least one parameter comprises limiting a gain applied to the haptic signal in the signal processing subsystem prior to combination with the audio signal; and
the at least one operational limit comprises an excursion limit of the single mechanical transducer.

18. A method comprising:
receiving an audio signal and a haptic signal;
processing the audio signal and the haptic signal to generate a combined audio-haptic signal;
driving the combined audio-haptic signal to a single mechanical transducer in order to generate concurrent audio playback and haptic effects on a vibrating surface mechanically coupled to the single mechanical transducer; and
responsive to a stimulus for generating haptic effects on the vibrating surface, other than haptic feedback from the vibrating surface, modifying at least one parameter of at least one of the audio signal and the haptic signal to accommodate the concurrent audio playback and haptic effects on the vibrating surface within at least one operational limit of the system.

19. The method of claim 18, wherein:
the at least one parameter comprises a gain applied to the audio signal in the signal processing subsystem prior to combination with the haptic signal; and
the at least one operational limit of the system comprises a full-scale magnitude of the signal processing subsystem.

20. The method of claim 19, further comprising modifying the gain based on a magnitude of the haptic signal.

21. The method of claim 19, further comprising ramping the gain from a first gain to a second gain lower than the first gain in response to the stimulus.

22. The method of claim 18, wherein:
the at least one parameter comprises filtering applied to the audio signal in the signal processing subsystem prior to combination with the haptic signal; and
the at least one operational limit of the system comprises an excursion limit of the single mechanical transducer.

23. The method of claim 22, wherein:
further comprising filtering the audio signal with a filter; and
controlling a frequency response of the filter based on an excursion of the single mechanical transducer as a function of frequency.

24. The method of claim 23, wherein:
the filter comprises a high-pass filter; and
the method further comprises controlling a corner frequency of the high-pass filter based on the excursion of the single mechanical transducer as the function of frequency.

25. The method of claim 18, wherein:
the at least one parameter comprises limiting applied to the audio signal in the signal processing subsystem prior to combination with the haptic signal; and the at least one operational limit comprises an excursion limit of the single mechanical transducer.

26. The method of claim 25, further comprising:
splitting the audio signal into a high-frequency component and a low-frequency component; and
limiting one of the high-frequency component and the low-frequency component so that when such one of the high-frequency component and the low-frequency component as limited is combined with the haptic signal, such combined signal remains within the excursion limit of the single mechanical transducer.

27. The method of claim 26, further comprising:
determining an excursion estimate based on the haptic signal and such one of the high-frequency component and the low-frequency component; and
limiting such one of the high-frequency component and the low-frequency component based on the excursion estimate.

28. The method of claim 27, wherein:
the at least one operational limit further comprises a full-scale magnitude of the signal processing subsystem; and
the method further comprises limiting the combined audio-haptic signal to the full-scale magnitude.

29. The method of claim 18, wherein the vibrating surface comprises a display screen of an electronic device.

30. The method of claim 18, wherein the single mechanical transducer comprises a piezoelectric transducer.

31. The method of claim 18, wherein the single mechanical transducer comprises a coil-based dynamic transducer.

32. The method of claim 18, wherein the single mechanical transducer comprises a speaker.

33. The method of claim 18, wherein:
the at least one parameter comprises a gain applied to the haptic signal in the signal processing subsystem prior to combination with the audio signal; and
the at least one operational limit of the system comprises a full-scale magnitude of the signal processing subsystem.

34. The method of claim 18, wherein:
the at least one parameter comprises limiting a gain applied to the haptic signal in the signal processing subsystem prior to combination with the audio signal; and
the at least one operational limit comprises an excursion limit of the single mechanical transducer.

* * * * *